United States Patent
Chen et al.

(10) Patent No.: US 8,116,572 B2
(45) Date of Patent: Feb. 14, 2012

(54) METHOD FOR DETECTING IMAGE EDGE AND IMAGE INTERPOLATION USING THE SAME

(75) Inventors: Tsui-Chin Chen, Hsinchu (TW); Hsing-Chuan Chen, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 901 days.

(21) Appl. No.: 12/147,497

(22) Filed: Jun. 27, 2008

(65) Prior Publication Data
US 2009/0238463 A1   Sep. 24, 2009

(30) Foreign Application Priority Data
Mar. 24, 2008  (TW) ................. 97110411 A (51) Int. Cl.
*G06K 9/46* (2006.01)
(52) U.S. Cl. ........ 382/190; 382/300; 382/199; 348/452; 348/458; 348/459
(58) Field of Classification Search .............. 382/190, 382/199, 300; 348/452, 207, 3, 458, 459
See application file for complete search history.

(56) References Cited

U.S. PATENT DOCUMENTS

| | | | |
|---|---|---|---|
| 6,133,957 A | 10/2000 | Campbell | |
| 6,980,254 B1 | 12/2005 | Nishihashi et al. | |
| 7,161,602 B2 | 1/2007 | Shan | |
| 2001/0022858 A1 | 9/2001 | Komiya et al. | |
| 2003/0038817 A1* | 2/2003 | Kawamura et al. | 345/606 |
| 2005/0190992 A1* | 9/2005 | Lee | 382/300 |
| 2006/0139485 A1* | 6/2006 | Kim et al. | 348/441 |

OTHER PUBLICATIONS

"Office Action of Taiwan Counterpart Application", issued on Aug. 30, 2011, p1-p4, in which the listed references were cited.

* cited by examiner

*Primary Examiner* — Samir Ahmed
*Assistant Examiner* — Ruiping Li
(74) *Attorney, Agent, or Firm* — Jianq Chyun IP Office (57) ABSTRACT

A method for detecting an image edge is provided. Pixel data of neighbor lines of an image are read to generate a first and a second inclined edge areas between two neighbor lines. The incline edge areas are determined by detecting whether a difference of two corresponding pixel data exceeds a preset edge threshold. Then, whether there is an overlapped or nearby portion between the inclined edge areas is determined, so as to find an incline edge.

16 Claims, 6 Drawing Sheets

METHOD FOR DETECTING IMAGE EDGE AND IMAGE INTERPOLATION USING THE SAME

CROSS-REFERENCE TO RELATED APPLICATION

This application claims the priority benefit of Taiwan application serial no. 97110411, filed on Mar. 24, 2008. The entirety of the above-mentioned patent application is hereby incorporated by reference herein and made a part of this specification.

BACKGROUND OF THE INVENTION

1. Field of the Invention

The present invention generally relates to a de-interlacing method, in particular, to an edge detection method of the de-interlacing method.

2. Description of Related Art

One way to increase the resolution of television images is to convert an interlaced image into a progressive-scanned image. In a de-interlacing processing, in order to increase the resolution and eliminate jagged rims of inclined edges of the image, an inclined interpolation processing is always performed on an inclined line portion in the image.

In the prior art, for example, an adaptive diagonal interpolation for image resolution enhancement is disclosed in U.S. Pat. No. 6,133,957. In such method, the difference between the pixels at different angles within a certain range is calculated. Finally, the angle corresponding to the smallest difference is adapted as the slope of the inclined line, and the interpolation is performed with the slope.

However, the above method cannot accurately obtain the positions of the inclined line of the image or precisely calculate the slope (angle) of the inclined line. In the case that the position or angle is not correct, the jags in the image cannot be eliminated and the resolution cannot be effectively enhanced. Even worse, the interpolation effect is degraded, and random line or noise is generated on the image.

Therefore, it is in urgent need of a simple and accurate method for detecting an inclined edge and its inclined angle in an image, so as to enhance the resolution of display image.

SUMMARY OF THE INVENTION

Accordingly, the present invention is directed to a method for detecting an image edge so as to enhance an image resolution.

The present invention provides a method for detecting an image edge, which includes the following steps. First, a first, a second, and a third pixel rows, adjacent to one another, in the image are read, and a plurality of pixel values of the respective first, second, and third pixel rows is read. Then, at least one first inclined edge area is generated between the first and the second pixel rows, and at least one second inclined edge area is generated between the second and the third pixel rows. The first and the second inclined edge areas are determined by detecting whether a difference of pixel values of corresponding pixel rows exceeds an edge threshold. Afterwards, whether there is an overlapped portion or a difference of a predetermined number of pixels between the first and the second inclined edge are as is determined. If so, an area between the first and the second inclined edge areas is determined as an inclined edge.

According to an embodiment of the present invention, the step of generating the first inclined edge area can further include the following steps. A subtract calculation is performed on the corresponding pixel values of the first and the second pixel rows to generate a pixel value difference. Then, an absolute value of the pixel value difference is compared with the edge threshold to determine if the absolute value exceeds the edge threshold. A tag is assigned between two pixels in the first and the second pixel rows when exceeding the edge threshold. A plurality of adjacent positions having the tag between the first and the second pixel rows is defined as the first inclined edge area. The second inclined edge area is generated in the same manner but with the data of the second and the third pixel rows instead of the first and the second pixel rows.

The present invention further provides an image interpolation method, which includes the following steps. First, a first, a second, and a third pixel rows, adjacent to one another, in the image are read, and a plurality of pixel values of the respective first, second, and third pixel rows is read. Then, at least one first inclined edge area is generated between the first and the second pixel rows, and at least one second inclined edge area is generated between the second and the third pixel rows. The first and the second inclined edge areas are determined by detecting whether a difference of pixel values of corresponding pixel rows exceeds an edge threshold. Afterwards, whether there is an overlapped portion or a difference of a predetermined number of pixels between the first and the second inclined edge are as is determined. If so, an area between the first and the second inclined edge areas is determined as an inclined line and an inclined interpolation area. Afterwards, a slope of the inclined line is determined by a line defined by a specific point in the respective first and second inclined edge areas. An inclined interpolation processing is performed by the use of the slope within the inclined interpolation area. Moreover, a vertical interpolation processing is performed out of the inclined interpolation area.

According to an embodiment of the present invention, the above inclined interpolation area is a union of a plurality of the first and the second inclined edge areas having an overlapped portion or a nearby portion. In addition, the above specific point is a first point, last point, or midpoint in the respective first and second inclined edge areas.

In view of the above, according to the method of the present invention, the position of the inclined line of the inclined edge can be detected more accurately by setting the inclined edge area. Moreover, in this method, the inclined edge area contains information of the slope of the inclined line, which can be used in the inclined interpolation processing, for carrying out the inclined interpolation processing with a more accurate angle. The present invention can enhance the resolution of the image.

In order to the make aforementioned and other objects, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In the enhancement of a resolution of display image, an interpolation is usually employed to interpose one or more lines between every two adjacent lines, for enhancing the resolution. In this manner, an inclined interpolation is performed on a portion of the image having an inclined line, and a vertical interpolation is performed if the image does not have inclined lines. The present invention provides a method for effectively and precisely determining a correct position of the inclined line for the inclined interpolation portion. Moreover, the method can provide a more precise slope of the inclined line, so as to make the inclined interpolation more precise and achieve a better resolution enhancement effect.

Figure 1:
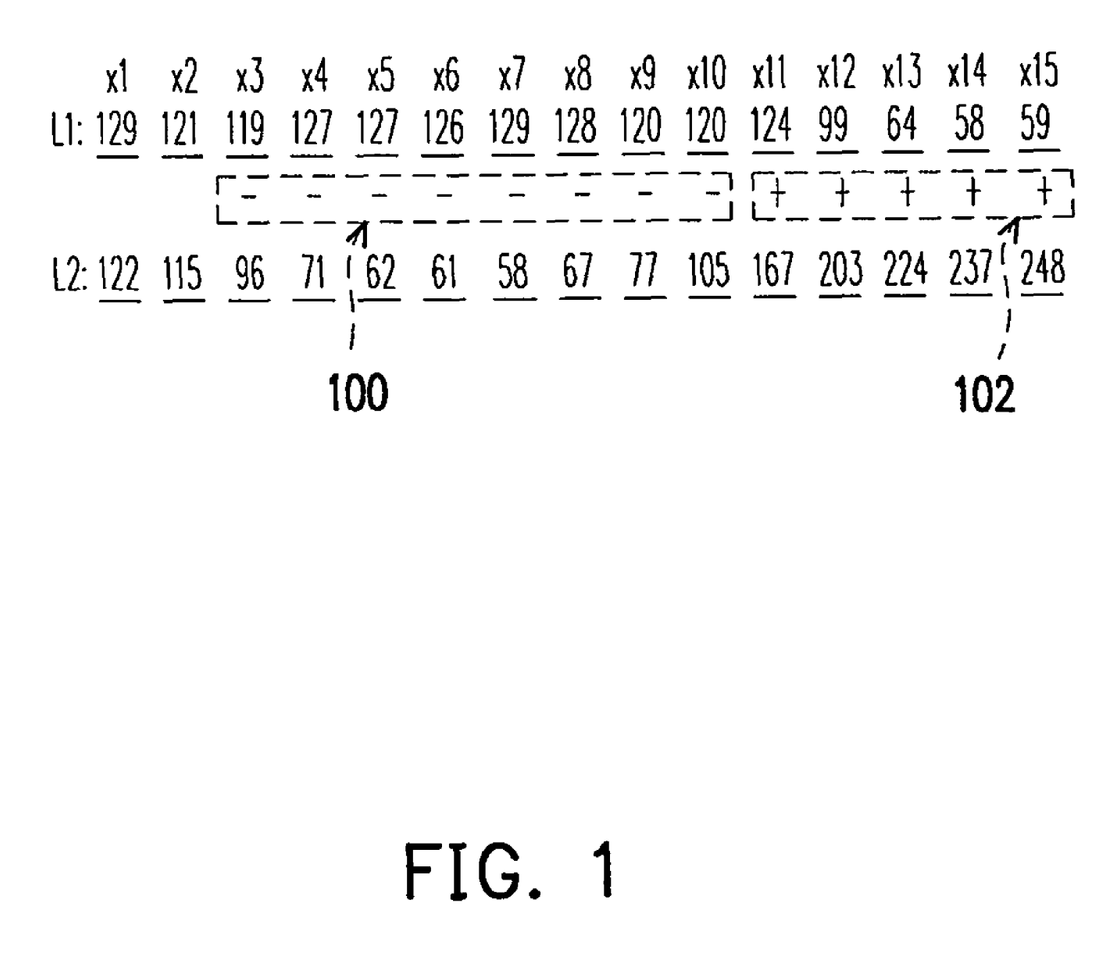
FIG. 1 is a schematic view illustrating an inclined edge area according to this embodiment.

FIG. 1 is a schematic view illustrating an inclined edge area according to this embodiment. As shown in FIG. 1, pixel values of a part of two adjacent lines L1 and L2 in an image signal are illustrated. The numerals in the figure are the pixel values and range from, for example, 0 to 255. In this figure, the numerals are used for illustration only, and should not be interpreted as limitations of the invention.

In this embodiment, the inclined edge area is divided into two types, one is a negative inclined edge area and the other is a positive inclined edge area. Then, the definitions of an inclined edge pixel and the inclined edge area will be illustrated.

In implementation of the method of this embodiment, first, an edge threshold is defined. This edge threshold is used as a reference for determining an inclined edge pixel and can be set according to actual requirements. In this embodiment, an edge threshold is, for example, 10, and should not be interpreted as limitations of the invention. The edge threshold is mainly used for determining whether a pixel value difference between corresponding points in the adjacent lines in the image is large enough to regard the pixel as an inclined edge pixel.

As shown in FIG. 1, in pixel data of the two adjacent lines L1 and L2, a pixel value of respective pixel Xi (in this example, i=1-15) of the upper row line L1 is subtracted from a pixel value of respective corresponding pixel Xi in the lower row line L2 to obtain a positive or a negative pixel value difference at each point. Here, the pixel value can be gray scale, brightness, luminance, or other various appropriate display values that can be considered by those skilled in the art.

For each pixel Xi, when the pixel value of the point in the lower row line L2 is smaller than the pixel value of the corresponding point in the upper row line L1 and the absolute value of the difference exceeds the above edge threshold, a "−" tag is assigned. On the contrary, if the pixel value of the point in the lower row line L2 is larger than that of the corresponding point in the upper row line L1 and the absolute value of the difference exceeds the above edge threshold, a "+" tag is assigned. Here, the tags "+" and "−" are used for illustration only, and any two different tags can be used for distinguishing, for example, "1" and "0" instead of "+" and "−".

In FIG. 1, the situation that a pixel value difference between corresponding pixels in the upper and lower rows L1 and L2 is assigned with a negative tag ("−") is called a negative edge. For example, for the pixels of corresponding column X3 in FIG. 1, the pixel value in the row L1 is 119, the pixel value in the row L2 is 96, and a difference therebetween is −23 whose absolute value exceeds 10, the preset threshold. Therefore, a "−" tag is assigned between the two rows, i.e., a negative edge is determined. In addition, a plurality of continuous negative edges having the "−" tags composes the so-called negative edge area 100 in this embodiment, for example, an area enclosed by the columns X3 and X10 in FIG. 1.

On the contrary, the situation that a pixel value difference between corresponding pixels in the upper and lower rows L1 and L2 is assigned with a positive tag ("+") is called a positive edge. For example, for the pixels of corresponding column X11 in FIG. 1, the pixel value in the row L1 is 124, the pixel value in the row L2 is 167, a difference therebetween is 43 whose absolute value exceeds 10, the preset threshold. Therefore, a "+" tag is assigned between the two rows, i.e., a positive edge is determined. In addition, a plurality of continuous positive edges having the "+" tags composes the so-called positive edge area 102 in this embodiment, for example, an area enclosed by the columns X11 and X15 in FIG. 1.

In addition, for each pixel of a corresponding portion from the column X1 to X2, since the absolute value of the difference between the pixel values of the upper and lower rows L1 and L2 does not exceed 10, the edge threshold, and thus no tags are assigned.

The negative and the positive edge areas determined in the above manner can be used to detect a position of the inclined line in the image.

Figure 2:
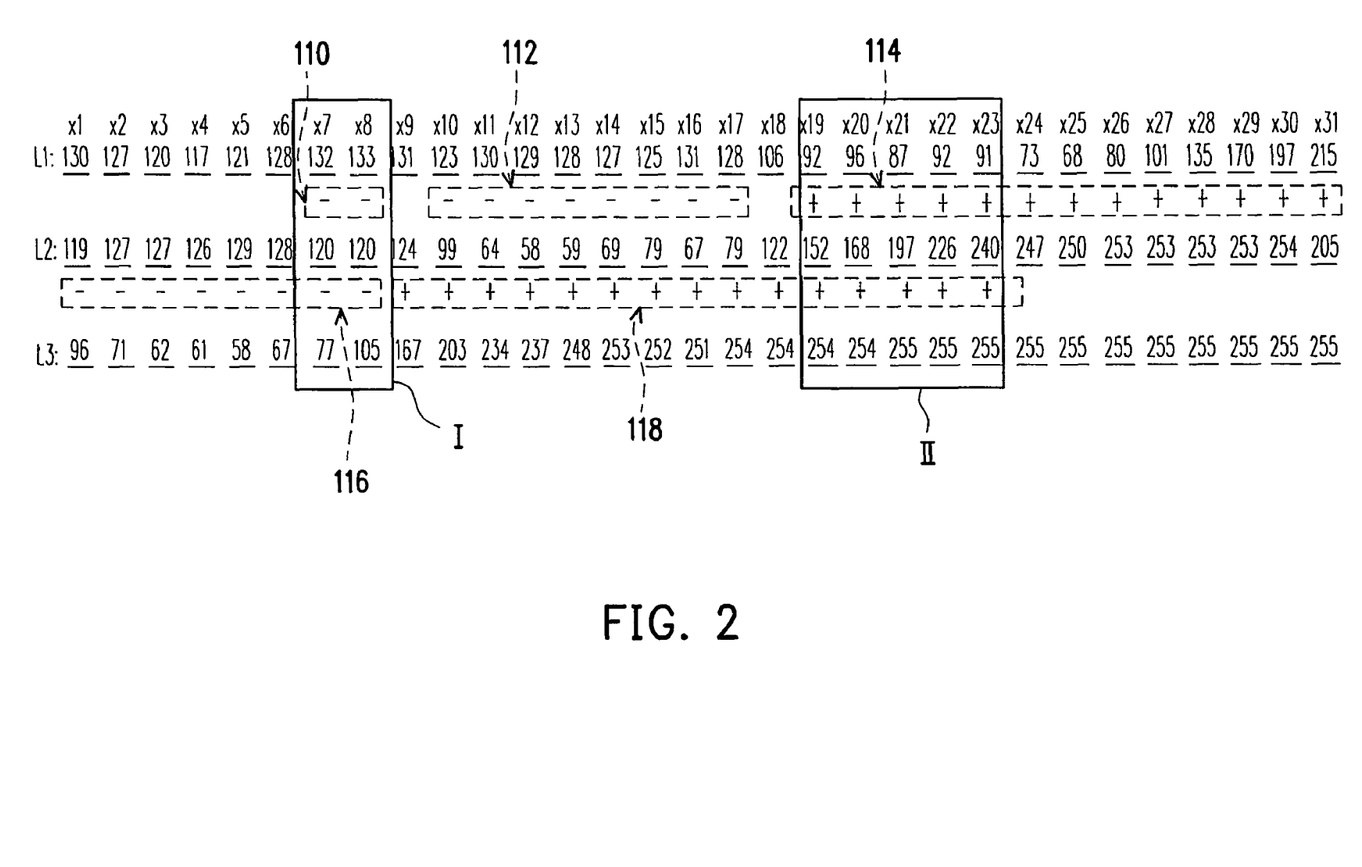
FIG. 2 is a schematic view illustrating a method for determining an inclined edge area.
Figure 3:
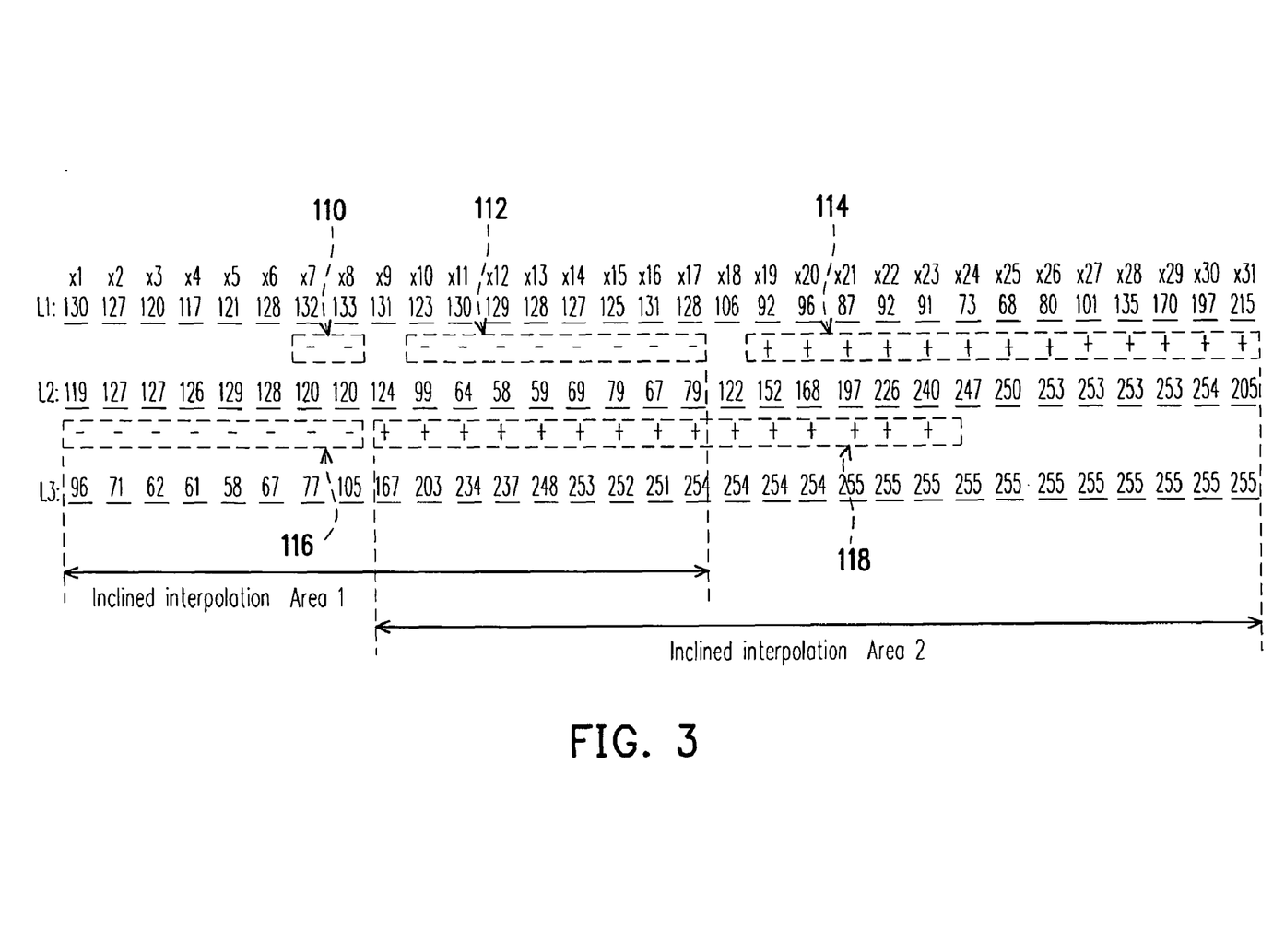
FIG. 3 is a schematic view illustrating an area where an inclined interpolation needs to be performed according to this embodiment.
Figure 4:
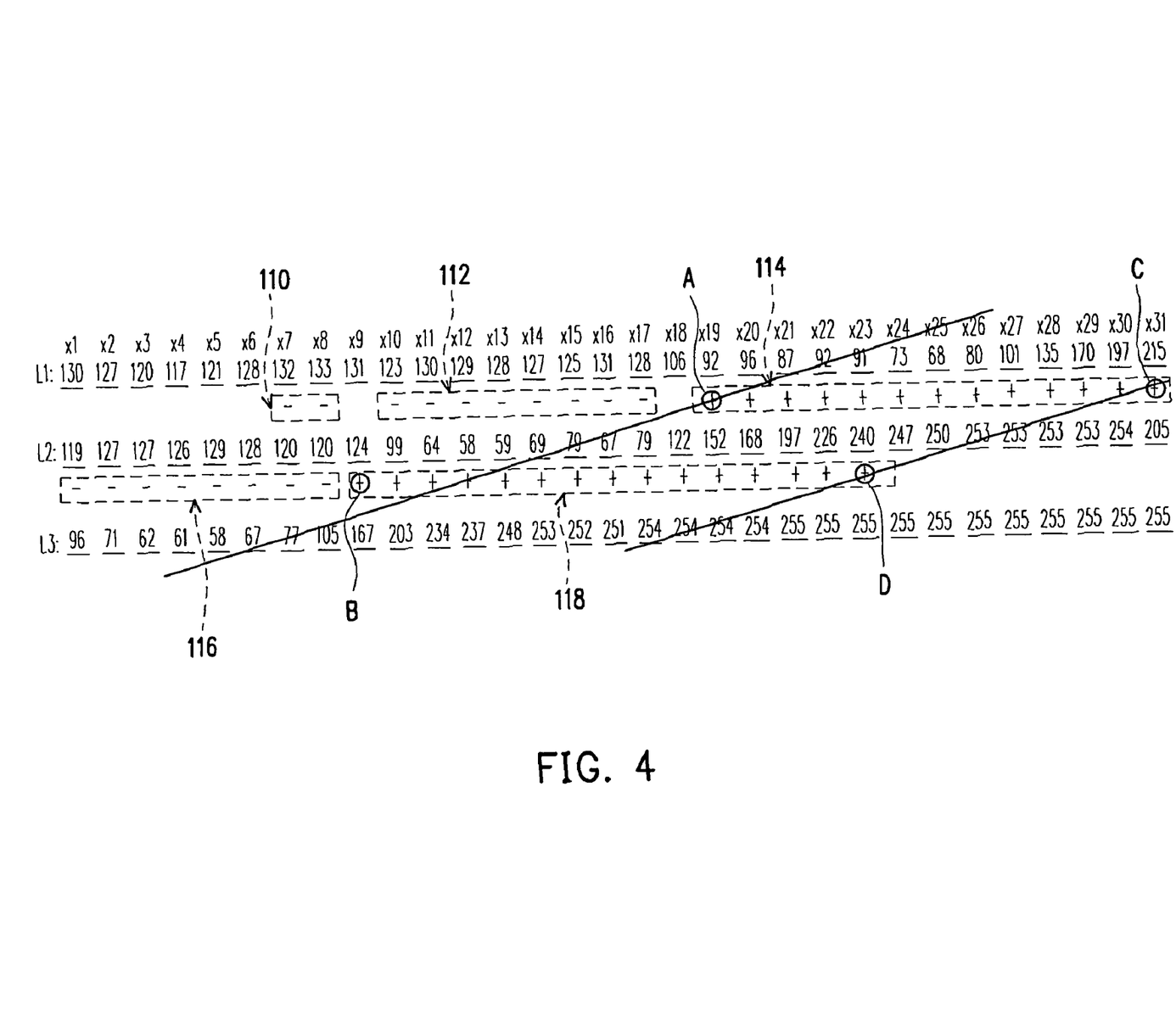
FIG. 4 is a schematic view illustrating a detection of an angle at which the inclined interpolation is performed according to this embodiment.

Next, the method of this embodiment is illustrated for marking the obvious position of inclined line in the image. In FIGS. 2 to 4, three adjacent lines are used to illustrate the method for marking an inclined edge.

In the manner of FIG. 1, tags of two edge areas are generated through the data of three continuous pixel rows L1, L2, and L3. FIG. 2 illustrates pixels of columns X1 to X31. The 31 columns are used for illustration only, and should not be interpreted as limitations of the invention. As shown in FIG. 2, the pixel data of the rows L1 and L2 respectively generates a negative edge area 110, a negative edge area 112, and a positive edge area 114. Similarly, the pixel data of the rows L2 and L3 respectively generates a negative edge area 116 and a positive edge area 118.

After determining the edge areas between every two adjacent pixels, whether there is an overlapped portion or a nearby portion of two upper and lower adjacent edge areas is determined. The so-called overlapped or nearby portion refers to that edge points assigned with the same tag exist between pixels of corresponding columns between the two upper and lower adjacent edge areas, i.e., the pixel positions of the upper and lower rows are located in the same column. For example, as shown in FIG. 2, between the pixels of columns X6 to X8, the negative edge area 110 between the rows L1 and L2 and the negative edge area 116 between the rows L2 and L3 are overlapped between columns X7 to X8, and the overlapped area is area I. Similarly, between the pixels of columns X19 to X23, the positive edge area 114 between the rows L1 and L2 and the positive edge area 118 between the rows L2 and L3 are overlapped, and the overlapped area is area II. In addition, a threshold can be set to determine whether there is a nearby portion of two inclined edges is determined. For example, a difference of 5 pixels is used as a reference for determining whether there is a nearby portion, and the number of pixels can be varied according to actual requirements.

Once an overlapped portion is determined, an inclined edge can be determined existence. In other words, if there is an overlapped portion or a nearby portion of two upper and lower adjacent edge areas, the image where the edge areas are located is determined to have an inclined edge. An independent edge area, i.e., without overlapped portion or nearby portion, is determined to have no inclined edges.

After an area where the inclined edge exists is determined, an area in need of the inclined interpolation is determined (marked). FIG. 3 is a schematic view illustrating an area in need of the inclined interpolation according to this embodiment.

After an area where the inclined edge exists is detected, an interpolation processing of de-interlacing will be performed. As described above, during the de-interlacing, a so-called inclined interpolation processing will be performed between two rows of pixels in the area where the inclined edge exists in the same image, and a so-called vertical interpolation processing will be performed between two rows of pixels without any inclined edge areas. Therefore, an area correlated with an inclined edge must be marked at the inclined edge, and the inclined interpolation processing is only performed within the area. The vertical interpolation processing is performed on a portion except the area. However, the interpolation processing can also be performed on the portion except the area in other manners.

As shown in FIG. 3, when an inclined edge position is determined by edge areas (positive and negative) as illustrated in FIGS. 1 and 2, the area in need of the inclined interpolation has already been marked by the upper and lower adjacent edge areas having an overlapped portion or a nearby portion. The interpolation processing area is a union of the positive and the negative edge areas. Then, a further explanation is made.

As described in the above FIG. 2, since the overlapped portion of the negative edge areas is the area I, the area I and the negative edge areas 110, 112, and 116 etc. nearby the area I are included in area 1 which need of the inclined interpolation. Similarly, since the overlapped portion of the positive edge areas is the area II, the overlapped area II and the edge areas 114, 118, etc. nearby the overlapped area II are included in an area 2 which need of the inclined interpolation. The inclined interpolation processing needs to be performed on a union of the areas 1 and 2 shown in FIG. 3, i.e., the entire area from column X1 to X31.

Then, after the inclined interpolation processing area is determined, an angle at which the inclined interpolation is performed is to be determined. FIG. 4 is a schematic view illustrating a detection of an angle at which the inclined interpolation is performed according to this embodiment.

After the position of the inclined edge and the area in need of the inclined interpolation is detected, an angle of the inclined edge will be determined. A correct angle is contributive to eliminating the jags of an inclined line of the inclined edge and making the display image more comfort and sharp, thereby enhancing the resolution. On the contrary, an incorrect angle can lower the inclined interpolation effect, and even worse, generate defects or noise on the image, thus degrading the resolution.

Figure 5A:
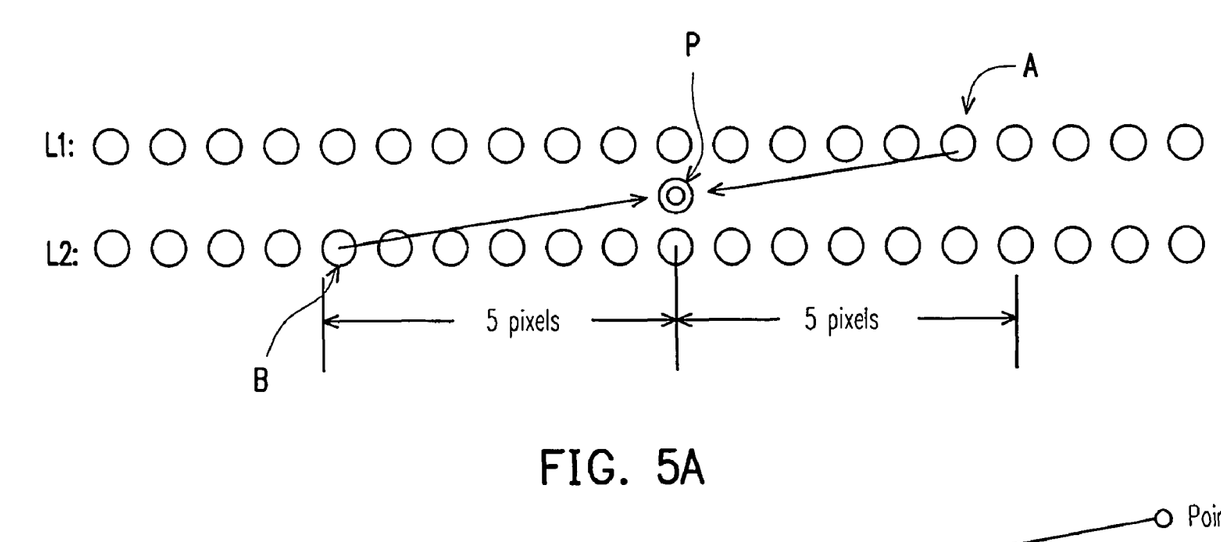
FIGS. 5A and 5B are schematic views illustrating a slope of an inclined line of the inclined edge according to this embodiment.
Figure 5B:
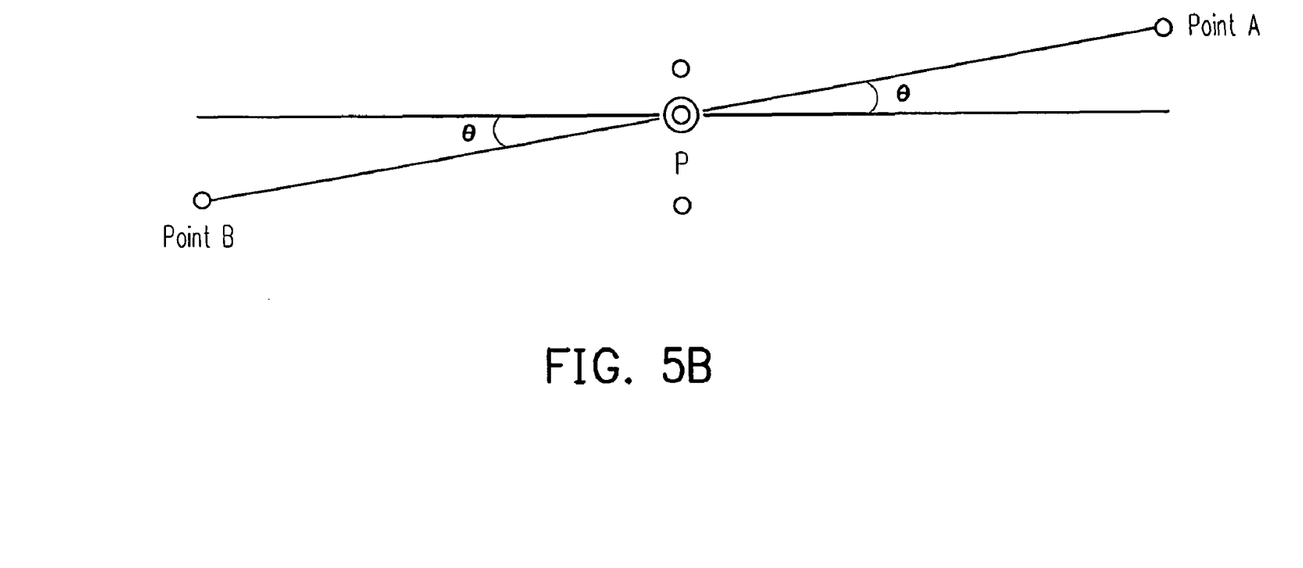

In the above steps, in the detected area having the inclined line of the inclined edge, the related upper and lower adjacent edge areas, for example, 114 and 118 in FIG. 2, contain the angle (slope) information. The following illustration is made with reference to FIGS. 4, 5A, and 5B. FIG. 4 is a schematic view illustrating a detection of an angle at which the inclined interpolation is performed according to this embodiment. FIGS. 5A and 5B are schematic views illustrating a slope of the inclined line of the inclined edge according to this embodiment.

As shown in FIG. 4, the above positive edge areas are taken as an example for illustration. The overlapped area II in FIG. 2 is used for determining the position where the inclined line of the inclined edge exists. Afterwards, with reference to the overlapped area II, the related upper and lower adjacent areas are the positive edge areas 114 and 118. The slope of the inclined line determined by the positive edge areas 114 and 118 is the distance between the edge areas, i.e., the detected slope of the inclined line, or the angle formed by connecting the related upper and lower edge areas. Thus, the angle can be determined in the following manners.

As shown in FIG. 4, the first point (column X19) A of the positive edge area 114 and the first point (column X9) B of the positive edge area 118 are used as two end points, and the end points A and B are connected to obtain a line AB. The inclined line AB can determine the slope. As shown in FIGS. 5A and 5B, the illustration in FIG. 4 is simplified for ease of illustration. It can be clearly seen from FIGS. 5A and 5B that the inclined line AB has a length of 10 pixels in the horizontal direction and a height of two pixels since two rows of pixels are included. Therefore, the slope (angle $\theta$) that is 5 is obtained.

In addition, as described above, intervals of every 5 pixels on the left and right of the central point P are the areas in need of the inclined interpolation, and the inclined interpolation is performed at the slope of the inclined line AB obtained by the above method. Therefore, the position of the inclined line of the inclined edge and the angle at which the inclined interpolation is performed are determined according to this embodiment, thereby precisely enhancing the resolution.

In the above example, the first points in the two upper and lower adjacent inclined edge areas are connected to determine the inclined line and then the slope. In addition, the final points, for example, points C and D shown in FIG. 4 in the two inclined edge areas can be used to determine the inclined line and then the slope. It can be seen from the figure that the slopes determined by the two inclined lines AB and CD are almost the same. In addition, midpoints of the two inclined edge areas can be selected to determine the slope. Or, the interpolation is performed on both ends by the use of the slopes of AB and CD, and performed on the middle portion with an average of the two slopes.

In this manner, the inclining tendency of the interposed pixels in the inclined interpolation can be precisely obtained, so that the display of the image is more vivid.

Figure 6:
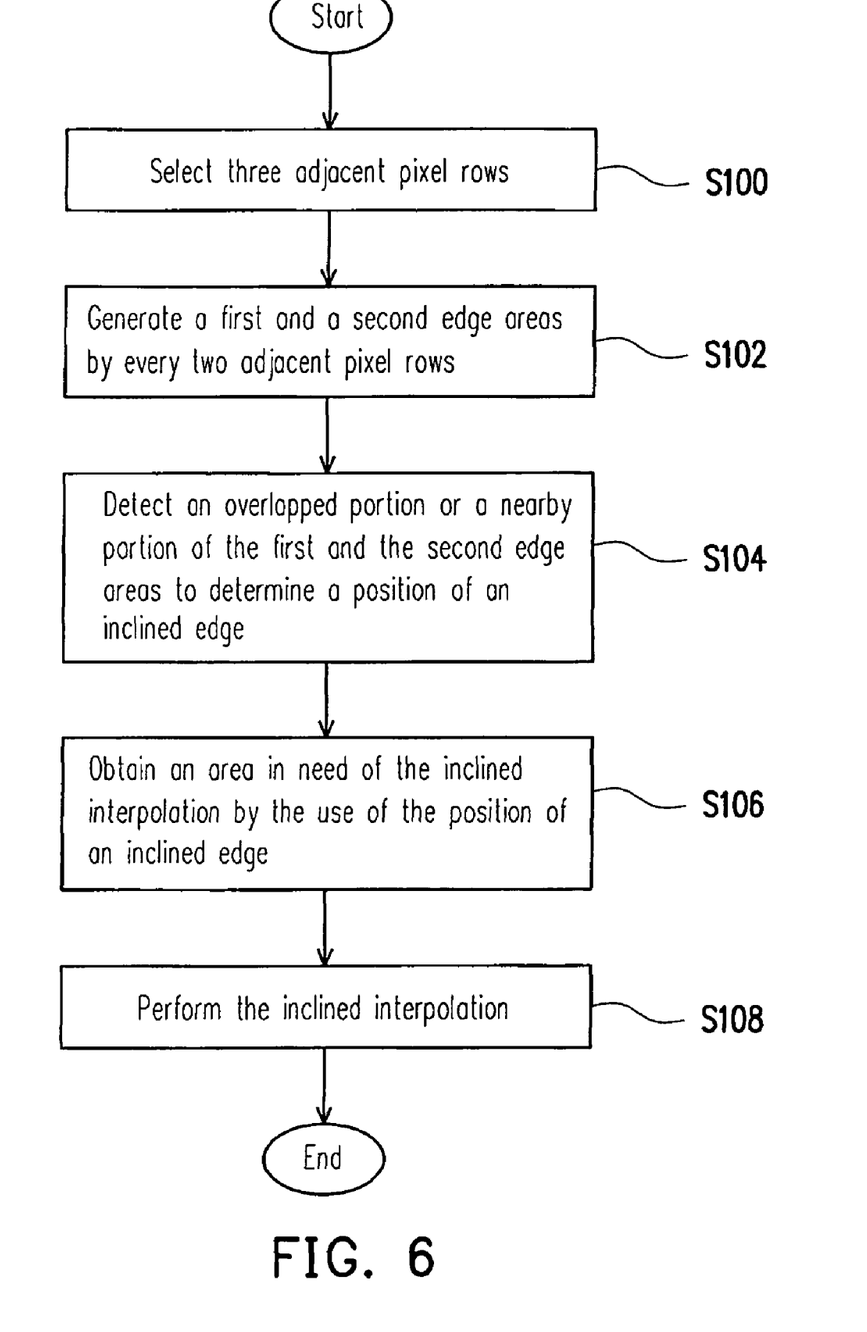
FIG. 6 is a schematic view illustrating processes of a method for detecting a position of the inclined line in the present invention.

FIG. 6 is a schematic view illustrating processes of a method for detecting an inclined edge and an inclined interpolation processing using the same according to this embodiment.

As shown in FIG. 6, first in step S100, three adjacent pixel rows are selected (read). An image is substantially composed of a plurality of horizontal pixel rows. This embodiment is implemented with three continuous pixel rows. In addition, for the entire image, all of the pixel rows are progressively read in this manner to perform the above-described inclined edge detection and inclined interpolation processing, so as to complete the resolution enhancement processing on the entire image.

Then, in step S102, a first and a second inclined edge areas are generated by every two adjacent pixel rows in the above step S100. For example, the first inclined edge areas 110, 112, or 114 are generated by the rows L1 and L2, and the second inclined edge area 116 or 118 is generated by the rows L2 and L3. Here, the first and the second inclined edge areas refer to upper and lower adjacent edge areas with the same tag, for example, the same tag of positive or negative.

The edge area can be generated in the following manner. First, a subtract calculation is performed on the respective pixel values of two pixel rows, and an absolute value of the difference is compared with an edge threshold to determine whether a positive or negative edge point exists between two adjacent pixels. A collection of adjacent positive or negative edge points in the same row composes an inclined edge area.

Afterwards, in step S104, whether there is an overlapped portion or a nearby portion of the first and the second inclined edge areas is determined, and the definitions of the overlapped portion or the nearby portion can refer to the above description. If there is an overlapped portion or a nearby portion of the first and the second inclined edge areas, this area is determined to have an inclined line of an inclined edge, and the edge detection is completed. On the contrary, if there is no overlapped portion or nearby portion of the first and the second inclined edge areas, this area is determined to have no inclined lines of an inclined edge.

Then, in step S106, an area in need of the inclined interpolation is obtained by the use of the overlapped or nearby inclined edge. The first and the second inclined edge areas having an overlapped portion or a nearby portion determined in the step S104 are set to be the area in need of the inclined interpolation. That is to say, all of the first and the second inclined edge areas having an overlapped portion or a nearby portion in the three adjacent pixel rows are united, and the encompassed area is the area in the three pixel rows in need of the inclined interpolation.

Then in step S108, a slope (angle) of an inclined line of the inclined edge is determined. After the area in need of the inclined interpolation is determined in the step S106, the slope (angle) of the inclined line of the inclined edge is obtained by the use of the above overlapped portion or a nearby portion of the first and the second inclined edge areas. The detailed description of the method can refer to those described in FIGS. 4, 5A, and 5B.

Finally, the inclined interpolation processing is performed in the area determined in the step S106 with the obtained slope. That is to say, the inclined interpolation processing is performed in the area between every two of the three adjacent pixel rows in need of the inclined interpolation by the use of the slope. In addition, a vertical interpolation processing is performed on a portion except the area. However, the interpolation processing can be performed on the portion except the area in other manners. In this way, the resolution is enhanced during the de-interlacing, thereby eliminating the jagged edges of the inclined edges of the image.

In view of the above, according to the method of the present invention, the position of the inclined lined of the inclined edge can be detected more accurately by setting the inclined edge area. Moreover, in this method, the inclined edge area contains information of the slope of the inclined line, which can be used in the inclined interpolation processing, so as to precisely perform the inclined interpolation processing at a more correct angle. Through the technique of the present invention, the resolution of the image can be further enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for detecting an image edge, comprising:
    reading a first, a second, and a third pixel rows, adjacent to one another in the image, and reading a plurality of pixel values of the respective first, second, and third pixel rows;
    generating at least one first inclined edge area between the first and the second pixel rows, and generating at least one second inclined edge area between the second and the third pixel rows, wherein the first and the second inclined edge areas are determined by detecting whether a difference of pixel values of corresponding pixel rows exceeds an edge threshold;
    detecting whether an overlapped portion or a gap within a predetermined number of pixels exists between the first and the second inclined edge areas; and
    determining an area between the first and the second inclined edge areas is an inclined edge when the overlapped portion or the gap within the predetermined number of pixels exists between the first and the second inclined edge areas.

2. The method for detecting an image edge according to claim 1, wherein generating the first inclined edge area further comprises:
    performing a subtract calculation on the corresponding pixel values in the first and the second pixel rows to generate a pixel value difference;
    comparing an absolute value of the pixel value difference with the edge threshold to determine if the absolute value exceeds the edge threshold;
    assigning a tag between two pixels in the first and the second pixel rows when exceeding the edge threshold; and
    defining a plurality of adjacent positions having the tag between the first and the second pixel rows as the first inclined edge area.

3. The method for detecting an image edge according to claim 2, wherein generating the second inclined edge area further comprises:
    performing a subtract calculation on the corresponding pixel values of the second and the third pixel rows to generate a pixel value difference;
    comparing an absolute value of the pixel value difference with the edge threshold to determine if the absolute value exceeds the edge threshold;
    assigning the tag between two pixels in the second and the third pixel rows when exceeding the edge threshold; and
    defining a plurality of adjacent positions having the tag between the second and the third pixel rows as the second inclined edge area.

4. The method for detecting an image edge according to claim 2, wherein the tag is a binary data.

5. The method for detecting an image edge according to claim 4, wherein the binary data is positive or negative.

6. The method for detecting an image edge according to claim 1, wherein the edge area is a union of a plurality of the first and the second inclined edge areas having an overlapped portion or a nearby portion.

7. An image interpolation method, comprising:
    reading a first, a second, and a third pixel rows, adjacent to one another, in the image, and reading a plurality of pixel values of the respective first, second, and third pixel rows;
    generating at least one first inclined edge area between the first and the second pixel rows, and generating at least one second inclined edge area between the second and the third pixel rows, wherein the first and the second inclined edge areas are determined by detecting whether a difference of pixel values of corresponding pixel rows exceeds an edge threshold;
    detecting whether an overlapped portion or a gap within a predetermined number of pixels exists between the first and the second inclined edge areas; and
    determining an area between the first and the second inclined edge areas is an inclined line and an inclined interpolation area when the overlapped portion or the gap within the predetermined number of pixels exists between the first and the second inclined edge areas;
    determining a slope of the inclined line by a line defined by a specific point in the respective first and second inclined edge areas; and
    performing an inclined interpolation processing by the use of the slope within the inclined interpolation area.

8. The image interpolation method according to claim 7, further comprising:
    performing a vertical interpolation processing out of the inclined interpolation area.

9. The image interpolation method according to claim 7, wherein the inclined interpolation area is a union of a plurality of the first and the second inclined edge areas having an overlapped portion or a nearby portion.

10. The image interpolation method according to claim 7, wherein the specific point is a first point in the respective first and second inclined edge areas.

11. The image interpolation method according to claim 7, wherein the specific point is a last point in the respective first and second inclined edge areas.

12. The image interpolation method according to claim 7, wherein the specific point is a midpoint in the respective first and second inclined edge areas.

13. The image interpolation method according to claim 7, wherein generating the first inclined edge area further comprises:
    performing a subtract calculation on the corresponding pixel values of the first and the second pixel rows to generate a pixel value difference;
    comparing an absolute value of the pixel value difference with the edge threshold to determine if the absolute value exceeds the edge threshold;
    assigning a tag between two pixels in the first and the second pixel rows when exceeding the edge threshold; and
    defining a plurality of adjacent positions having the first tag between the first and the second pixel rows as the first inclined edge area.

14. The image interpolation method according to claim 13, wherein generating the second inclined edge area further comprises:
    performing a subtract calculation on the corresponding pixel values of the second and the third pixel rows to generate a pixel value difference;
    comparing an absolute value of the pixel value difference with the edge threshold to determine if the absolute value exceeds the edge threshold;
    assigning the tag between two pixels in the second and the third pixel rows when exceeding the edge threshold; and
    defining a plurality of adjacent positions having the tag between the second and the third pixel rows as the second inclined edge area.

15. The image interpolation method according to claim 13, wherein the tag is a binary data.

16. The image interpolation method according to claim 15, wherein the binary data is positive or negative.

* * * * *